United States Patent
Konishi et al.

(10) Patent No.: US 12,297,341 B2
(45) Date of Patent: May 13, 2025

(54) FLUORINE-CONTAINING ELASTOMER COMPOSITION AND ARTICLE

(71) Applicant: DAIKIN INDUSTRIES, LTD., Osaka (JP)

(72) Inventors: Tomohisa Konishi, Osaka (JP); Tsuyoshi Noguchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 655 days.

(21) Appl. No.: 17/612,764

(22) PCT Filed: May 19, 2020

(86) PCT No.: PCT/JP2020/019807
§ 371 (c)(1),
(2) Date: Nov. 19, 2021

(87) PCT Pub. No.: WO2020/235565
PCT Pub. Date: Nov. 26, 2020

(65) Prior Publication Data
US 2022/0243047 A1    Aug. 4, 2022

(30) Foreign Application Priority Data
May 20, 2019 (JP) ................................. 2019-094327

(51) Int. Cl.
*C08L 27/18*    (2006.01)

(52) U.S. Cl.
CPC .................................... *C08L 27/18* (2013.01)

(58) Field of Classification Search
CPC ..................................................... C08L 27/18
USPC ........................................................ 524/502
See application file for complete search history.

(56) References Cited

U.S. PATENT DOCUMENTS

| | | |
|---|---|---|
| 6,172,162 B1 | 1/2001 | Mouri |
| 6,703,461 B1 | 3/2004 | Tanaka et al. |
| 2004/0147698 A1 | 7/2004 | Tanaka et al. |
| 2005/0070637 A1 | 3/2005 | Nishibayashi et al. |
| 2006/0058448 A1* | 3/2006 | Higashino ............... C09K 3/10 524/544 |
| 2008/0287627 A1 | 11/2008 | Noguchi et al. |
| 2009/0076197 A1 | 3/2009 | Nishibayashi et al. |
| 2011/0086229 A1 | 4/2011 | Noguchi et al. |
| 2011/0171403 A1* | 7/2011 | Tabata ....................... C08J 3/28 428/35.5 |
| 2012/0053297 A1 | 3/2012 | Nakagawa et al. |

FOREIGN PATENT DOCUMENTS

| | | | |
|---|---|---|---|
| CN | 1604940 A | 4/2005 | |
| CN | 103242611 A | 8/2013 | |
| EP | 1719801 A1 * | 11/2006 | ............ B82Y 30/00 |
| JP | 59-100141 A | 6/1984 | |
| JP | 09-268245 A | 10/1997 | |
| JP | 2001-151086 A | 6/2001 | |
| JP | 2005-239835 A | 9/2005 | |
| JP | 2009-138158 A | 6/2009 | |
| JP | 2012-215823 A | 11/2012 | |
| JP | 2013-209665 A | 10/2013 | |
| WO | 97/08239 A1 | 3/1997 | |
| WO | 99/50319 A1 | 10/1999 | |
| WO | 03/051999 A1 | 6/2003 | |

OTHER PUBLICATIONS

International Search Report of PCT/JP2020/019807 dated Jul. 21, 2020 [PCT/ISA/210].
Extended European Search Report issued May 3, 2023 in application No. 20810740.9.
International Preliminary Report on Patentability dated Nov. 16, 2021 with a Translation of the Written Opinion of the International Searching Authority in Application No. PCT/JP2020/019807.

* cited by examiner

*Primary Examiner* — Deve V Hall
(74) *Attorney, Agent, or Firm* — Sughrue Mion, PLLC

(57) ABSTRACT

Provided is a fluorine-containing elastomer composition that contains a non-crosslinked fluorine-containing elastomer and a crosslinked perfluororesin.

6 Claims, No Drawings

FLUORINE-CONTAINING ELASTOMER COMPOSITION AND ARTICLE

CROSS REFERENCE TO RELATED APPLICATIONS

This application is a National Stage of International Application No. PCT/JP2020/019807 filed on May 19, 2020, claiming priority based on Japanese Patent Application No. 2019-094327 filed on May 20, 2019.

TECHNICAL FIELD

The present disclosure relates to a fluorine-containing elastomer composition and an article

BACKGROUND ART

Fluorine-containing elastomer sealing materials are used in semiconductor fabrication apparatus and liquid crystal manufacturing apparatus. A filler may be added to the fluorine-containing elastomer composition for forming the sealing material for the purpose of increasing the strength of the fluorine-containing elastomer sealing material.

For example, in Patent Document 1, a composition for a sealing material is described, which is produced by blending 5 to 50% by weight of a fluorine-based resin fine powder, such as polytetrafluoroethylene powder, in a fluorine-based elastic body mainly composed of repeating units derived from a fluoroolefin and a perfluoroalkyl vinyl ether, respectively.

RELATED ART

Patent Documents

Patent Document 1: International Publication No. WO 97/08239

SUMMARY OF THE INVENTION

Problem to be Solved by the Invention

However, further improvement in plasma resistance and resistance to compression set of the sealing material is required.

It is an object of the present disclosure to provide a fluorine-containing elastomer composition from which an article having excellent plasma resistance and a small compression set even after being used under harsh conditions can be obtained.

Further, it is an object of the present disclosure to provide an article having excellent plasma resistance and a small compression set even after being used under harsh conditions.

Means for Solving the Problem

The present disclosure provides a fluorine-containing elastomer composition comprising a non-crosslinked fluorine-containing elastomer and a crosslinked perfluororesin.

The crosslinked perfluororesin is preferably at least one selected from the group consisting of a crosslinked polytetrafluoroethylene, a crosslinked tetrafluoroethylene/perfluoro(alkyl vinyl ether) copolymer, and a crosslinked tetrafluoroethylene/hexafluoropropylene copolymer.

More preferably, the crosslinked perfluororesin is a crosslinked polytetrafluoroethylene.

It is preferred that a content of the crosslinked perfluororesin is 0.5 to 100 parts by mass with respect to 100 parts by mass of the non-crosslinked fluorine-containing elastomer.

It is preferred that the fluorine-containing elastomer of the present disclosure composition further comprises a filler.

It is preferred that the fluorine-containing elastomer composition of the present disclosure further comprises a crosslinking agent.

Further, the present disclosure provides an article obtained from the above-described fluorine-containing elastomer composition.

In addition, the present disclosure provides an article comprising a polymer, wherein a rate of decrease in weight by $NF_3$ remote plasma is 0.20% or less, and a compression set is 55% or less when measured by, in a state in which the article is compressed at a compressibility of 25%, leaving the article at 200° C. for 70 hours, then further leaving at 70° C. for 24 hours, releasing the compression and leaving at 20° C. for 30 minutes.

In the article according to the present disclosure, the polymer is preferably a fluorine-containing elastomer.

Effects of Invention

According to the present disclosure, it is possible to provide a fluorine-containing elastomer composition from which an article having excellent plasma resistance and a small compression set even after being used under harsh conditions can be obtained.

Further, it is an object of the present disclosure to provide an article having excellent plasma resistance and a small compression set even after being used under harsh conditions.

DESCRIPTION OF EMBODIMENTS

Specific embodiments of the present disclosure will now be described in detail, but the present disclosure is not limited to the following embodiments.

The fluorine-containing elastomer composition of the present disclosure comprises a non-crosslinked fluorine-containing elastomer and a crosslinked perfluororesin.

<Fluorine-Containing Elastomer>

In the present disclosure, the non-crosslinked fluorine-containing elastomer is a fluorine-containing elastomer that is not crosslinked, and is an amorphous fluorine-containing elastomer. "Amorphous" refers to a state in which the melting peak ($\Delta H$) that appears in differential scanning calorimetry [DSC] (temperature-increasing rate 10° C./min) or differential thermal analysis [DTA] (temperature-increasing rate 10° C./min) of the fluorine-containing polymer is 4.5 J/g or less. Fluorine-containing elastomers exhibit elastomeric characteristics through cross-linking. "Elastomeric characteristics" means characteristics that allow the polymer to be stretched and to retain its original length when the force required to stretch the polymer is no longer applied.

The fluorine-containing elastomer may be a partially fluorinated elastomer or a perfluoroelastomer, but from the viewpoint of having excellent chemical resistance and heat resistance, it is preferably a perfluoroelastomer.

In the present disclosure, the partially fluorinated elastomer is a fluorine-containing polymer that includes a fluoromonomer unit, has a perfluoromonomer unit content of less than 90 mol % with respect to all the monomer units, has a glass transition temperature of 20° C. or lower, and has a melting peak (ΔH) of 4.5 J/g or less.

In the present disclosure, the perfluoroelastomer is a fluorine-containing polymer that has a perfluoromonomer unit content with respect to all the monomer units of 90 mol % or more, has a glass transition temperature of 20° C. or lower, and has a melting peak (ΔH) of 4.5 J/g or less, and further, has a fluorine atom concentration in the fluorine-containing polymer of 71% by mass or more. In the present disclosure, the fluorine atom concentration in the fluorine-containing polymer is determined by calculating the concentration (% by mass) of the fluorine atoms included in the fluorine-containing polymer from the type and content of each monomer constituting the fluorine-containing polymer.

In the present disclosure, the perfluoromonomer is a monomer that does not include a carbon atom-hydrogen atom bond in the molecule. The perfluoromonomer may be a monomer in which, in addition to carbon atoms and fluorine atoms, some of the fluorine atoms bonded to carbon atoms are replaced with chlorine atoms, and may have, other than carbon atoms, a nitrogen atom, an oxygen atom, and a sulfur atom. The perfluoromonomer is preferably a monomer in which all the hydrogen atoms are replaced with fluorine atoms. A monomer that provides a crosslinking site does not fall within the scope of the perfluoromonomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, and the like. Among these, at least one selected from the group consisting of vinylidene fluoride-based fluoroelastomers and tetrafluoroethylene/propylene-based fluoroelastomers is preferable.

The vinylidene fluoride-based fluoroelastomer is preferably a copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a copolymer comprising 50 to 80 mol % of vinylidene fluoride and 50 to 20 mol % of at least one other monomer copolymerizable with vinylidene fluoride.

In the present disclosure, the content of each monomer constituting the fluorine-containing elastomer can be calculated by appropriately combining NMR, FT-IR, elemental analysis, and X-ray fluorescence analysis according to the type of monomer.

Examples of the at least one other monomer copolymerizable with vinylidene fluoride include TFE, HFP, fluoroalkyl vinyl ether, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by formula (11): $CHX^{11}=CX^{11}Rf^{11}$ wherein of two $X^{11}$, one is H and the other is F, and $Rf^{11}$ is a linear or branched fluoroalkyl group having 1 to 12 carbon atoms, and a fluoromonomer represented by formula (12): $CH_2=CH-(CF_2)_n-X^{12}$ wherein $X^{12}$ is H or F, and n is an integer of 3 to 10; a monomer that provides a crosslinking site; and a non-fluorinated monomer such as ethylene, propylene, and alkyl vinyl ether. These can be used alone or in any combination.

Among these, it is preferable to use at least one selected from the group consisting of TFE, HFP, fluoroalkyl vinyl ether and CTFE.

The fluoroalkyl vinyl ether is preferably one selected from the group consisting of a fluoromonomer represented by formula (13):

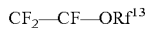
$CF_2=CF-ORf^{13}$ wherein $Rf^{13}$ represents a perfluoroalkyl group having 1 to 8 carbon atoms;
a fluoromonomer represented by formula (14):

$CF_2=CFOCF_2ORf^{14}$ wherein $Rf^{14}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms including 1 to 3 oxygen atoms; and
a fluoromonomer represented by formula (15):

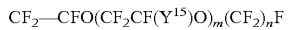
$CF_2=CFO(CF_2CF(Y^{15})O)_m(CF_2)_nF$ wherein $Y^{15}$ represents a fluorine atom or a trifluoromethyl group, M is an integer of 1 to 4, and n is an integer of 1 to 4. More preferably, the fluoroalkyl vinyl ether is a fluoromonomer represented by formula (13).

Specific examples of the vinylidene fluoride-based fluoroelastomer include a VdF/HFP-based rubber, a VdF/HFP/TFE-based rubber, VdF/CTFE-based rubber, a VdF/CTFE/TFE-based rubber, a VdF/fluoromonomer represented by formula (11)-based rubber, a VdF/fluoromonomer represented by formula (11)/TFE-based rubber, a VdF/perfluoro(methyl vinyl ether) [PMVE]-based rubber, a VdF/PMVE/TFE-based rubber, a VdF/PMVE/TFE/HFP-based rubber and the like. The VdF/fluoromonomer represented by formula (11)-based rubber is preferably a VdF/$CH_2=CFCF_3$-based rubber, and the VdF/fluoromonomer represented by formula (11)/TFE-based rubber is preferably VdF/TFE/$CH_2=CFCF_3$-based rubber.

The VdF/$CH_2=CFCF_3$-based rubber is preferably a copolymer comprising 40 to 99.5 mol % of VdF and 0.5 to 60 mol % of $CH_2=CFCF_3$, and more preferably 50 to 85 mol % of VdF and 15 to 50 mol % of $CH_2=CFCF_3$.

The tetrafluoroethylene/propylene-based fluoroelastomer is preferably a copolymer comprising 45 to 70 mol % of tetrafluoroethylene, 55 to 30 mol % of propylene, and 0 to 5 mol % of fluoromonomer that provides a crosslinking site.

The fluorine-containing elastomer may be a perfluoroelastomer. Examples of the perfluoroelastomer include at least one selected from the group consisting of a perfluoroelastomer including a TFE unit, for example, a copolymer of TFE/fluoromonomer monomer represented by formula (13), (14), or (15), and a copolymer of TFE/fluoromonomer monomer represented by formula (13), (14), or (15)/monomer providing a crosslinking site.

In the case of a TFE/PMVE copolymer, the compositional features thereof are preferably 45 to 90/10 to 55 (mol %), more preferably 55 to 80/20 to 45, and further preferably 55 to 70/30 to 45.

In the case of a copolymer of TFE/PMVE/monomer that provides a crosslinking site, the compositional features thereof are preferably 45 to 89.9/10 to 54.9/0.01 to 4 (mol %), more preferably 55 to 77.9/20 to 49.9/0.1 to 3.5, and further preferably 55 to 69.8/30 to 44.8/0.2 to 3.

In the case of a copolymer of TFE/fluoromonomer represented by formula (13), (14), or (15) having 4 to 12 carbon atoms, the compositional features thereof are preferably 50 to 90/10 to 50 (mol %), more preferably 60 to 88/12 to 40, and further preferably 65 to 85/15 to 35.

In the case of a copolymer of TFE/fluoromonomer represented by formula (13), (14), or (15) having 4 to 12 carbon atoms/monomer that provides a crosslinking site, the compositional features thereof are preferably 50 to 89.9/10 to 49.9/0.01 to 4 (mol %), more preferably 60 to 87.9/12 to 39.9/0.1 to 3.5, and further preferably 65 to 84.8/15 to 34.8/0.2 to 3.

If the compositional features of these copolymers are beyond these ranges, their nature as a rubber elastic body is lost, and the copolymer tends to have a nature close to that of a resin.

Examples of the perfluoroelastomer include at least one selected from the group consisting of a copolymer of TFE/fluoromonomer represented by formula (15)/monomer that provides a crosslinking site, a copolymer of TFE/fluoromonomer represented by formula (15), a copolymer of TFE/fluoromonomer represented by formula (13), and a copolymer of TFE/fluoromonomer represented by formula (13)/monomer that provides a crosslinking site.

Examples of the perfluoroelastomer may include the perfluoroelastomers described in International Publication No. WO 97/24381, Japanese Patent Publication No. 61-57324, Japanese Patent Publication No. 4-81608, Japanese Patent Publication No. 5-13961, and the like.

The monomer that provides a crosslinking site is a monomer (cure site monomer) having a crosslinkable group that provides the fluorine-containing elastomer with a crosslinking site for forming a crosslink by a cross-linking agent.

Examples of the monomer that provides a crosslinking site include monomers represented by formula (16):

wherein $X^4$ and $X^5$ are each independently H, F, or an alkyl group having 1 to 5 carbon atoms, $R_f^2$ is a linear or branched alkylene group or oxyalkylene group which may have one or more ether-bonding oxygen atoms, which may have an aromatic ring, and in which a part or all of its hydrogen atoms may be replaced with fluorine atoms, and $X^6$ is an iodine atom, a bromine atom, a nitrile group, a carboxyl group, an alkoxycarbonyl group, a hydroxyl group, a vinyl group, an azide group, a sulfonyl azide group, a carbonyl azide group, or an alkyne group. The alkyne group may be an ethynyl group.

The monomer that provides a crosslinking site is preferably, from among the following, at least one selected from the group consisting of:

a fluoromonomer represented by formula (17):

$$CX^{16}_2\!=\!CX^{16}\!-\!Rf^{16}CHR^{16}X^{17}$$

wherein each $X^{16}$ is independently a hydrogen atom, a fluorine atom, or $CH_3$, $Rf^{16}$ is a fluoroalkylene group, a perfluoroalkylene group, a fluoro(poly)oxyalkylene group, or a perfluoro(poly)oxyalkylene group, $R^{16}$ is a hydrogen atom or $CH_3$, and $X^{17}$ is an iodine atom or a bromine atom; a fluoromonomer represented by formula (18):

$$CX^{16}_2\!=\!CX^{16}\!-\!Rf^{17}X^{17}$$

wherein each $X^{16}$ is independently a hydrogen atom, a fluorine atom, or $CH_3$, $Rf^{17}$ is a fluoroalkylene group, a perfluoroalkylene group, a fluoro(poly)oxyalkylene group, or a perfluoro(poly)oxyalkylene group, and $X^{17}$ is an iodine atom or a bromine atom;

a fluoromonomer represented by formula (19):

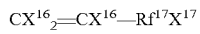

wherein m is an integer of 0 to 5, n is an integer of 1 to 3, and $X^{18}$ is a cyano group, an azide group, a sulfonyl azide group, a carbonyl azide group, a carboxyl group, an alkoxycarbonyl group, an alkyne group, an iodine atom, a bromine atom, or $—CH_2I$;

a fluoromonomer represented by formula (20):

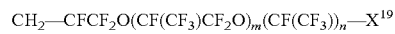

wherein m is an integer of 0 to 5, n is an integer of 1 to 3, and $X^{19}$ is a cyano group, a carboxyl group, an alkoxycarbonyl group, an iodine atom, a bromine atom, or $—CH_2OH$; and a monomer represented by formula (21):

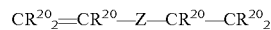

wherein each $R^{20}$ is independently a hydrogen atom or an alkyl group having 1 to 5 carbon atoms, and Z is a linear or branched alkylene group having 1 to 18 carbon atoms which may have an oxygen atom, a cycloalkylene group having 3 to 18 carbon atoms, an alkylene group or an oxyalkylene group having 1 to 10 carbon atoms which is at least partially fluorinated, or a (per)fluoropolyoxyalkylene group having a molecular weight of 500 to 10,000 and represented by

wherein Q is an alkylene group or an oxyalkylene group, P is 0 or 1, and m/n is 0.2 to 5.

$X^{16}$ is preferably a fluorine atom. $Rf^{16}$ and $Rf^{17}$ are preferably a perfluoroalkylene group having 1 to 5 carbon atoms. $R^{16}$ is preferably a hydrogen atom. $X^{18}$ is preferably a cyano group, an alkoxycarbonyl group, an iodine atom, a bromine atom, or $—CH_2I$. $X^{19}$ is preferably a cyano group, an alkoxycarbonyl group, an iodine atom, a bromine atom, or $—CH_2OH$.

The monomer that provides the crosslinking site is preferably at least one selected from the group consisting of $CF_2\!=\!CFOCF_2CF(CF_3)OCF_2CF_2CN$, $CF_2\!=\!CFOCF_2CF(CF_3)OCF_2CF_2COOH$, $CF_2\!=\!CFOCF_2CF(CF_3)OCF_2CF_2CH_2I$, $CF_2\!=\!CFOCF_2CF_2CH_2I$, $CH_2\!=\!CFCF_2OCF(CF_3)CF_2OCF(CF_3)CN$, $CH_2\!=\!CFCF_2OCF(CF_3)CF_2OCF(CF_3)COOH$, $CH_2\!=\!CFCF_2OCF(CF_3)CF_2OCF(CF_3)CH_2OH$, $CH_2\!=\!CHCF_2CF_2I$, $CH_2\!=\!CH(CF_2)_2CH\!=\!CH_2$, $CH_2\!=\!CH(CF_2)_6CH\!=\!CH_2$, and $CF_2\!=\!CFO(CF_2)_5CN_2$, and more preferably at least one selected from the group consisting of $CF_2\!=\!CFOCF_2CF(CF_3)OCF_2CF_2CN$ and $CF_2\!=\!CFOCF_2CF_2CH_2I$.

From the viewpoint of excellent resistance to compression set at high temperature, the fluorine-containing elastomer has a glass transition temperature of preferably $-70°$ C. or higher, more preferably $-60°$ C. or higher, and further preferably $-50°$ C. or higher. Further, from the viewpoint of good cold resistance, the fluorine-containing elastomer has a glass transition temperature of preferably $5°$ C. or lower, more preferably $0°$ C. or lower, and further preferably $-3°$ C. or lower.

The glass transition temperature is determined as follows: using a differential scanning calorimeter (DSC822e, manufactured by Mettler Toledo), a DSC curve is obtained by heating 10 mg of a sample at $10°$ C./min; and the temperature is read at the intermediate point of two intersections between each of the extension lines of the baselines before and after the secondary transition of the DSC curve and the tangent line at the inflection point of the DSC curve.

From the viewpoint of good heat resistance, the fluorine-containing elastomer has a Mooney viscosity ML (1+20) at 170° C. of preferably 30 or more, more preferably 40 or more, and further preferably 50 or more. Further, from the viewpoint of good processability, the fluorine-containing elastomer has a Mooney viscosity ML of preferably 150 or less, more preferably 120 or less, and further preferably 110 or less.

From the viewpoint of good heat resistance, the fluorine-containing elastomer has a Mooney viscosity ML (1+20) at 140° C. of preferably 30 or more, more preferably 40 or more, and further preferably 50 or more. Further, from the viewpoint of good processability, the fluorine-containing elastomer has a Mooney viscosity ML of preferably 180 or less, more preferably 150 or less, and further preferably 110 or less.

From the viewpoint of good heat resistance, the fluorine-containing elastomer has a Mooney viscosity ML (1+10) at 100° C. of preferably 10 or more, more preferably 20 or more, and further preferably 30 or more. Further, from the viewpoint of good processability, the fluorine-containing elastomer has a Mooney viscosity ML of preferably 120 or less, more preferably 100 or less, and further preferably 80 or less.

The Mooney viscosity can be measured at 170° C., 140° C., or 100° C. according to JIS K6300 by using a Mooney viscometer MV2000E manufactured by ALPHA TECHNOLOGIES.

The above-described partially fluorinated elastomer and perfluoroelastomer can be produced by a conventional method. However, from the viewpoint of a narrow molecular weight distribution of the obtained polymer, easy control of the molecular weight, and being able to introduce an iodine atom or a bromine atom to a terminal, an iodine compound or a bromine compound can also be used as a chain transfer agent. Examples of a polymerization method performed using an iodine compound or a bromine compound include a method in which emulsion polymerization is carried out in an aqueous medium under pressure in the presence of the iodine compound or the bromine compound in a substantially oxygen-free state (iodine transfer polymerization method). Typical examples of the iodine compound or bromine compound to be used include, for example, a compound represented by the formula:

wherein x and y are each an integer of 0 to 2 and satisfy 1≤x+y≤2; and $R^{21}$ is a saturated or unsaturated fluorohydrocarbon group or chlorofluorocarbon group having 1 to 16 carbon atoms or a hydrocarbon group having 1 to 3 carbon atoms, which may contain an oxygen atom. By using an iodine compound or a bromine compound, an iodine atom or a bromine atom is introduced into the polymer to function as a cross-linking point.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diode-2,4-dichloroperfluoropentane, 1,6-diiodoperfluorohexane, 1,8-diiodoperfluorooctane, 1,12-diiodoperfluorododecane, 1,16-diiodineperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, a monoiodomonobromo-substituted benzene, a diiodomonobromo-substituted benzene, and a (2-iodoethyl)-substituted benzene and a (2-bromoethyl)-substituted benzene, and the like. These compounds can be used alone or in combination together.

Among these, it is preferable to use 1,4-diiodoperfluorobutane, 1,6-diiodoperfluorohexane, or 2-iodoperfluoropropane from the viewpoint of polymerization reactivity, cross-linking reactivity, availability, and the like.

The fluorine-containing elastomer preferably has a cyano group (—CN group). In a fluorine-containing elastomer having a cyano group (—CN group), the cyano group can form a triazine ring by cyclization trimerization to enable crosslinking, thereby enabling superior resistance to compression set and heat resistance to be imparted to the article (crosslinked product).

The fluorine-containing elastomer having a cyano group preferably has the cyano group (—CN group) at a terminal of the main chain and/or in a side chain.

Examples of the fluorine-containing elastomer having a cyano group (—CN group) at a terminal of the main chain and/or in a side chain include a perfluoroelastomer and a partially fluorinated elastomer.

Examples of the perfluoroelastomer having a cyano group (—CN group) at a terminal of the main chain and/or in a side chain include, copolymers in which the monomer that provides a crosslinking site is a monomer having a cyano group (—CN group) among the above-described copolymers of TFE/fluoromonomer represented by formula (13), (14), or (15)/monomer that provides a crosslinking site. In this case, the content of the monomer unit having a cyano group (—CN group) may be 0.1 to 5 mol % with respect to the total amount of the TFE unit and the fluoromonomer unit represented by formula (13), (14), or (15), from the viewpoint of good crosslinking characteristics and heat resistance, and may even be 0.3 to 3 mol %. Even more preferable compositional features are as described above.

Further, examples of the monomer having a cyano group (—CN group) include monomers represented by the following formulas:

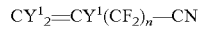

wherein each $Y^1$ is independently a hydrogen atom or a fluorine atom, and n is an integer of 1 to 8;

wherein $Rf^8$ is —(OCF_2)_n— or —(OCF(CF_3))_n—, and n is an integer of 0 to 5;

wherein m is an integer of 0 to 5, and n is an integer of 0 to 5;

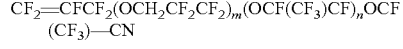

wherein m is an integer of 0 to 5, and n is an integer of 0 to 5;

wherein m is an integer of 0 to 5, and n is an integer of 1 to 8;

wherein m is an integer of 1 to 5;

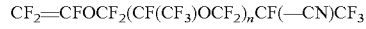

wherein n is an integer of 1 to 4;

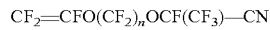

wherein n is an integer of 2 to 5;

CF$_2$=CFO(CF$_2$)$_n$—(C$_6$H$_4$)—CN            Formula:

wherein n is an integer of 1 to 6;

CF$_2$=CF(OCF$_2$CF(CF$_3$))$_n$OCF$_2$CF(CF$_3$)—CN    Formula:

wherein n is an integer of 1 to 2;

CH$_2$=CFCF$_2$P(CF(CF$_3$)CF$_2$O)$_n$CF(CF$_3$)—CN    Formula:

wherein n is an integer of 0 to 5;

CF$_2$=CFO(CF$_2$CF(CF$_3$)O)$_m$(CF$_2$)$_n$—CN        Formula:

wherein m is an integer of 0 to 5, and n is an integer of 1 to 3;

CH$_2$=CFCF$_2$OCF(CF$_3$)OCF(CF$_3$)—CN;       Formula:

CH$_2$=CFCF$_2$OCH$_2$CF$_2$—CN;                 Formula:

CF$_2$=CFO(CF$_2$CF(CF$_3$)O)$_m$CF$_2$CF(CF$_3$)—CN    Formula:

wherein m is an integer of 0 or more;

CF$_2$=CFOCF(CF$_3$)CF$_2$O(CF$_2$)$_n$—CN       Formula:

wherein n is an integer of 1 or more; and

CF$_2$=CFOCF$_2$OCF$_2$CF(CF$_3$)OCF$_2$—CN.     Formula:

These monomers can be used alone or in any combination.

Among the above, a monomer represented by the

CF$_2$=CF(OCF$_2$CF(CF$_3$))$_m$O(CF$_2$)$_n$—CN    formula:

wherein m is an integer of 0 to 5, n is an integer of 1 to 8; and CF$_2$=CFOCF$_2$CF(CF$_3$)OCF$_2$CF$_2$CN is more preferable.

These perfluoroelastomers can be produced by a conventional method.

Specific examples of the perfluoroelastomer may include the fluoroelastomers described in International Publication No. WO 97/24381, Japanese Patent Publication No. 61-57324, Japanese Patent Publication No. 4-81608, Japanese Patent Publication No. 5-13961, and the like.

Examples of the partially fluorinated elastomer having a cyano group (—CN group) at a terminal of the main chain and/or in a side chain include vinylidene fluoride (VdF)-based fluoroelastomers, tetrafluoroethylene (TFE)/propylene-based fluoroelastomers, tetrafluoroethylene (TFE)/propylene/vinylidene fluoride (VdF)-based fluoroelastomers, ethylene/hexafluoroethylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, fluorinesilicone-based fluoroelastomers, fluorophosphazene fluoroelastomers, and the like. These can each be used alone, or in any combination as long as the effects of the present disclosure are not impaired.

The vinylidene fluoride-based fluoroelastomer is a fluorine-containing copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a fluorine-containing copolymer comprising 50 to 80 mol % of vinylidene fluoride and 50 to 20 mol % of at least one other monomer copolymerizable with vinylidene fluoride.

Examples of the at least one other monomer copolymerizable with vinylidene fluoride include a fluoromonomer such as TFE, CTFE, trifluoroethylene, HFP, trifluoropropylene, tetrafluoropropylene, pentafluoropropylene, trifluorobutene, tetrafluoroisobutene, perfluoro(alkyl vinyl ether) (PAVE), and vinyl fluoride, and non-fluorinated monomers such as ethylene, propylene and alkyl vinyl ether. These can be used alone or in any combination. Among these, TFE, HFP, and perfluoro(alkyl vinyl ether) are preferable.

Specific examples of the rubber include VdF-HFP-based rubber, VdF-HFP-TFE-based rubber, VdF-CTFE-based rubber, VdF-CTFE-TFE-based rubber, and the like.

These partially fluorinated elastomers can be produced by a conventional method.

Further, as the fluorine-containing elastomer, a thermoplastic fluoroelastomer comprising an elastomeric fluorine-containing polymer chain segment and a non-elastomeric fluorine-containing polymer chain segment may be used.

<Crosslinked Perfluororesin>

The crosslinked perfluororesin used in the present disclosure is a crosslinked perfluororesin obtained by cross-linking a non-crosslinked perfluororesin. The crosslinked perfluororesin preferably has a structure in which fluoropolymer molecules constituting the perfluororesin are crosslinked with each other.

The crosslinked perfluororesin preferably contains a tertiary carbon. The tertiary carbon is usually formed by cross-linking a non-crosslinked perfluororesin, and is preferably formed by irradiating the non-crosslinked perfluororesin with radiation. The content of tertiary carbon may be 0.035 to 0.100 mol % with respect to the total of all the monomer units constituting the crosslinked perfluororesin.

The presence or absence of a tertiary carbon formed by cross-linking in the crosslinked perfluororesin can be confirmed by, for example, performing a $^{19}$F-NMR measurement on the crosslinked perfluororesin under the measurement conditions described below and confirming the presence or absence of a chemical shift in the vicinity of −183 ppm. When a tertiary carbon is present in the crosslinked perfluororesin, a chemical shift derived from the F atom on the tertiary carbon is detected.

When the crosslinked perfluororesin contains only tetrafluoroethylene (TFE) units, or when it contains TFE units and a trace amount of a modifying monomer unit, the content of the tertiary carbon in the crosslinked perfluororesin can be calculated in accordance with the below calculation formula by performing a $^{19}$F-NMR measurement and determining the following peak intensities (integral values of the peaks) A to D, for example.

$^{19}$F-NMR Measurement Conditions

Measuring device: Solid $^{19}$F-NMR measuring device, manufactured by Bruker Measurement conditions: 282 MHz (CF$_2$ of crosslinked perfluororesin taken as −120 ppm), rotation speed 30 kHz Peak Intensity A Intensity of the peaks derived from the three C—F* of CF$_3$ observed at chemical shifts of −60 to −85 ppm Peak Intensity B Intensity of the peaks derived from the four C—F* mainly derived from TFE observed at chemical shifts of −90 to −150 ppm Peak Intensity C Intensity of the peaks derived from the one C—F* of CF observed at chemical shifts of −150 to −160 ppm Peak Intensity D Intensity of the peaks of the F* derived from tertiary carbon-CF$_2$CF*(—CF$_2$—)CF$_2$— observed at chemical shifts of −176 to −190 ppm Calculation Formula $$\text{Content (mol \%) of tertiary carbon} = \\ 100 \times (\text{peak intensity } D) / \{(\text{peak intensity } A/3) + \\ (\text{peak intensity } B/4) + (\text{peak intensity } C) + (\text{peak intensity } D)\}$$

When the crosslinked perfluororesin contains tetrafluoroethylene (TFE) units and perfluoro (alkyl vinyl ether) (PAVE) units, the content of the tertiary carbon in the crosslinked perfluororesin can be calculated in accordance with the below calculation formula by performing a $^{19}$F-NMR measurement and determining the following peak intensities (integral values of the peaks) A to C, for example.

$^{19}$F-NMR Measurement Conditions

Measuring device: Solid $^{19}$F-NMR measuring device, manufactured by Bruker

Measurement conditions: 282 MHz ($CF_2$ of crosslinked perfluororesin taken as −120 ppm), rotation speed 30 kHz Peak Intensity A When the PAVE is perfluoro (propyl vinyl ether) (PPVE), intensity of the peaks derived from the five C—F* of the —O—$CF^*_2$— and —$CF^*_3$ of the PPVE observed at a chemical shift of −80 (−74 to −85) ppm Peak Intensity B Intensity of the peaks where the five C—F* of the PPVE and the four C—F* derived from TFE observed at a chemical shift of −120 (−84 to −150) ppm overlap Peak Intensity C Intensity of the peaks of the F* derived from tertiary carbon —$CF_2CF^*$(—$CF_2$—)$CF_2$— observed at a chemical shift of −183 (−176 to −191) ppm Calculation Formula $$\text{Content (mol \%) of tertiary carbon} = \\ 100 \times (\text{peak intensity } C) / \{(\text{peak intensity } A/5) + \\ [\text{peak intensity } B\text{-peak intensity } A]/4 + (\text{peak intensity } C)\}$$

A preferable method for cross-linking the non-crosslinked perfluororesin is a method of irradiating the non-crosslinked perfluororesin with radiation.

The temperature at which the radiation is irradiated is preferably 80 to 360° C., more preferably 100° C. or higher, further preferably 140° C. or higher, and is more preferably 350° C. or lower.

Adjustment of the irradiation temperature is not limited, and can be performed by a known method. Specific examples include a method of holding the perfluororesin in a heating furnace maintained at a predetermined temperature, a method of placing the perfluororesin on a hot plate and energizing a heating heater built in the hot plate or heating the hot plate by external heating means, and the like.

The irradiation dose of the radiation is preferably 1 to 2500 kGy, more preferably 1000 kGy or less, further preferably 750 kGy or less, and is more preferably 30 kGy or more, and further preferably 80 kGy or more.

Examples of the radiation include electron beams, ultraviolet rays, gamma rays, X-rays, neutron rays, high-energy ions, and the like. Among them, electron beams are preferable because of their excellent penetrating power, high dose rate, and suitability for industrial production.

The method of irradiating the radiation is not limited, and examples thereof include a method of irradiating radiation using a conventionally known radiation irradiation device and the like.

The irradiation environment of the radiation is not limited, but preferably the oxygen concentration is 1000 ppm or less. An oxygen-free environment is more preferable, and a vacuum or an atmosphere of an inert gas such as nitrogen, helium or argon is further preferable.

A non-crosslinked perfluororesin is used to obtain the crosslinked perfluororesin. In the present disclosure, the perfluororesin is a partially crystalline perfluoropolymer in which all monovalent atoms bonded to the carbon atoms constituting the main chain of the polymer are fluorine atoms, and so the perfluororesin is a perfluoroplastic and not a perfluoroelastomer. Perfluororesins have a melting point and are thermoplastic. The perfluororesin may contain 1% by mass or less of partially fluorinated monomer units and non-fluorinated monomer units with respect to all the monomer units constituting the perfluororesin. Further, in the perfluororesin, an atom other than a fluorine atom may be present in the polymer terminal group, that is, the group terminating the polymer chain. A polymer terminal group is usually a group derived from the polymerization initiator or chain transfer agent used for the polymerization reaction.

The fluorine content of the crosslinked perfluororesin is preferably 75.0% by mass or more, and more preferably 75.5% by mass or more, and is preferably 76.0% by mass or less. The fluorine content of crosslinked perfluororesin can be calculated from the monomeric composition of the crosslinked perfluororesin.

The crosslinked perfluororesin preferably contains a tetrafluoroethylene unit. The content of the tetrafluoroethylene unit in the crosslinked perfluororesin is, with respect to all the monomer units constituting the crosslinked perfluororesin, preferably 85% by mass or more, and more preferably 90% by mass or more, and is preferably 100% by mass or less. The content of the tetrafluoroethylene unit in the crosslinked perfluororesin can be determined by $^{19}$F-NMR analysis.

The crosslinked perfluororesin is preferably at least one selected from the group consisting of a crosslinked polytetrafluoroethylene (PTFE), a crosslinked tetrafluoroethylene/perfluoro (alkyl vinyl ether) copolymer (PFA), and a crosslinked tetrafluoroethylene/hexafluoropropylene copolymer (FEP), more preferably a crosslinked PTFE, and further preferably a crosslinked modified PTFE.

Further, two or more crosslinked perfluororesins may be used in combination. For example, a combination of a crosslinked PTFE and a crosslinked PFA and a combination of a crosslinked PTFE and a crosslinked FEP can be used.

The crosslinked perfluororesin may be non-melt-fabricable or may be melt-fabricable, but is preferably melt-fabricable. When the perfluororesin is melt-fabricable, the melt viscosity or melt flow rate (MFR) of the perfluororesin can be measured by a measuring method described later. The MFR of the perfluororesin is preferably 1 to 100 g/10 min, more preferably 1 to 50 g/10 min, and particularly preferably 2 to 30 g/10 min, because this allows an article having sufficient plasma resistance and resistance to compression set to be obtained and enables the mixing with the fluorine-containing elastomer to be performed easily.

In the present disclosure, the MFR is a value obtained in accordance with ASTM D1238 using a melt indexer (manufactured by Yasuda Seiki Seisakusho Co., Ltd.) as the mass (g/10 minutes) of the polymer flowing out from a nozzle having an inner diameter of 2.1 mm and a length of 8 mm per 10 minutes at a measurement temperature determined by the type of fluoropolymer (for example, 380° C. in the case of PTFE, and 372° C. in the case of PFA or FEP) under a load (for example, 5 kg in the case of PTFE, PFA, and FEP).

The melting point of the perfluororesin is preferably 190 to 355° C., more preferably 200° C. or higher, further preferably 220° C. or higher, particularly preferably 280° C. or higher, and most preferably 324° C. or higher, and is more preferably 350° C. or lower. The melting point is the temperature corresponding to the peak on the heat-of-fusion curve when the temperature is raised at a rate of 10° C./min using a differential scanning calorimeter (DSC).

The crosslinked PTFE is obtained by crosslinking the PTFE. The PTFE may be fibrillatable or non-fibrillatable, but is preferably non-fibrillatable as this enables the mixing with the fluorine-containing elastomer to be performed easily. By cross-linking a non-crosslinked PTFE that is non-fibrillatable, a crosslinked PTFE that is non-fibrillatable is obtained. The term fibrillatable refers to the property of forming fibrils by "fiberizing". Whether or not a substance is fibrillatable can be determined by "paste extrusion", which is a typical method for forming molding a "high molecular weight PTFE powder", which is a powder made from a polymer of TFE. Generally, paste extrusion is possible because high molecular weight PTFE is fibrillatable. If an unbaked molded product obtained by paste extrusion substantially does not have strength or elongation, for example, if the elongation is 0% and it breaks when pulled, it can be considered that the molded product is not fibrillatable.

A PTFE that is non-fibrillatable usually is melt-fabricable. Melt-fabricable refers to the property that the polymer can be worked by melting it.

Further, it is preferable that the molecular weight of the PTFE is relatively low, and preferable that a melt viscosity at 380° C. is $1 \times 10^2$ to $7 \times 10^5$ Pa·s. A PTFE having a melt viscosity within the above range usually is non-fibrillatable.

The melt viscosity is a value measured in accordance with ASTM D1238 using a flow tester (manufactured by Shimadzu Corporation) and a 2ϕ-8L die by measuring a 2 g sample heated in advance at 380° C. for 5 minutes and maintaining at that temperature under a load of 0.7 MPa.

The PTFE preferably has a melting point of 324 to 336° C.

The PTFE may be a homo-PTFE composed of only tetrafluoroethylene (TFE) units, or may be a modified PTFE containing a TFE unit and a modifying monomer unit based on a modifying monomer copolymerizable with TFE. Since the compositional features of the polymer do not change between before and after the cross-linking, the crosslinked PTFE has the same compositional features as that of the non-crosslinked PTFE.

In the modified PTFE, the content of the modifying monomer unit is, with respect to all the monomer units, preferably 0.001 to 1% by mass, more preferably 0.01% by mass or more, further preferably 0.5% by mass or less, and further more preferably 0.1% by mass or less. In the present disclosure, the modifying monomer unit is a part of the molecular structure of the modified PTFE, and refers to the portion derived from the modifying monomer. The term total monomer units means all of the portions derived from monomers in the molecular structure of the modified PTFE. The content of the modifying monomer unit can be determined by a known method such as Fourier transform infrared spectroscopy (FT-IR).

The modifying monomer is not limited as long as it can be copolymerized with TFE. Examples of the modifying monomer include perfluoroolefins such as hexafluoropropylene [HFP]; chlorofluoroolefins such as chlorotrifluoroethylene [CTFE]; hydrogen-containing fluoroolefins such as trifluoroethylene and vinylidene fluoride [VDF]; fluoroalkyl vinyl ethers; perfluoroalkylethylene; ethylene and the like. Further, one type of the modifying monomer may be used, or a plurality of types of the modifying monomer may be used.

The fluoroalkyl vinyl ether is not limited, and examples thereof may include unsaturated perfluoro compounds represented by the following formula.

$$CF_2=CF-ORf \qquad (1)$$

In the formula, Rf represents a perfluoro organic group. In the present disclosure, "perfluoro organic group" means an organic group in which all of the hydrogen atoms bonded to carbon atoms are replaced with fluorine atoms. The perfluoro organic group may have an ether oxygen.

Examples of the fluoroalkyl vinyl ether include perfluoro (alkyl vinyl ether) [PAVE] in which Rf in formula (1) represents a perfluoroalkyl group having 1 to 10 carbon atoms. The number of carbon atoms of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, a perfluorohexyl group, and the like, and perfluoro (propyl vinyl ether) [PPVE] in which the perfluoroalkyl group is a perfluoropropyl group is preferable.

Further, further examples of the fluoroalkyl vinyl ether include fluoroalkyl vinyl ethers in which Rf in formula (1) is a perfluoro (alkoxyalkyl) group having 4 to 9 carbon atoms, fluoroalkyl vinyl ethers in which Rf is a group represented by the following formula:

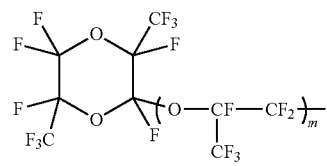

(in which m denotes an integer of 0 to 4), and fluoroalkyl vinyl ethers in which Rf is a group represented by the following formula:

$$CF_3CF_2CF_2-(O-CF(CF_3)-CF_2)_n-$$

(in which n denotes an integer of 1 to 4), and the like.

The perfluoroalkyl ethylene is not limited, and examples thereof include (perfluorobutyl)ethylene (PFBE), (perfluorohexyl)ethylene, (perfluorooctyl)ethylene, and the like.

The modifying monomer in the modified PTFE is preferably at least one selected from the group consisting of HFP, CTFE, VDF, PPVE, PFBE, and ethylene, and more preferably one selected from the group consisting of PPVE, HFP, and CTFE, further preferably at least one selected from the group consisting of PPVE and HFP, and particularly preferably is PPVE.

Crosslinked PFA is obtained by cross-linking PFA. PFA contains TFE units and PAVE units. The PAVE contained in the PFA is preferably an unsaturated perfluoro compound represented by formula (1) in which Rf is a perfluoroalkyl group having 1 to 10 carbon atoms, more preferably at least one selected from the group consisting of perfluoro(methyl vinyl ether), perfluoro (ethyl vinyl ether), and perfluoro (propyl vinyl ether) (PPVE), and further preferably is PPVE.

The content of the PAVE units in the PFA is, with respect to all the monomer units, preferably more than 1.0% by mass and 10% by mass or less, more preferably 2.0% by mass or more, further preferably 3.5% by mass or more, particularly preferably 4.0% by mass or more, and most preferably 5.0% by mass or more, and is more preferably 8.0% by mass or less, further preferably 7.0% by mass or less, particularly preferably 6.5% by mass or less, and most preferably 6.0% by mass or less.

The content of the TFE units in the PFA is, with respect to all the monomer units, preferably 90% by mass or more and less than 99.0% by mass, more preferably 92.0% by mass or more, further preferably 93.0% by mass or more, particularly preferably 93.5% by mass or more, and most preferably 94.0% by mass or more, and is more preferably 98.0% by mass or less, further preferably 97.5% by mass or less, particularly preferably 96.0% by mass or less, and most preferably 95.0% by mass or less.

The amount of the TFE units and the PAVE units can be measured by the $^{19}$F-NMR method. The PFA may be a copolymer consisting only of TFE units and PAVE units.

The melting point of the PFA is preferably 280 to 322° C., more preferably 290° C. or higher, and more preferably 315° C. or lower.

The glass transition temperature (Tg) of the PFA is preferably 70 to 110° C., more preferably 80° C. or higher, and more preferably 100° C. or lower. The glass transition temperature is a value obtained by measuring dynamic viscoelasticity.

Crosslinked FEP is obtained by cross-linking FEP. FEP contains TFE units and HFP units.

The content of the HFP units in the FEP is, with respect to all the monomer units, preferably more than 1.0% by mass and 30% by mass or less, more preferably 3.0% by mass or more, and further preferably 5.0% by mass or more, and is more preferably 15.0% by mass or less, and further preferably 10.0% by mass or less.

The content of the TFE units in the FEP is, with respect to all the monomer units, preferably 70% by mass or more and less than 99.0% by mass, more preferably 85.0% by mass or more, and further preferably 90.0% by mass or more, and is more preferably 97.0% by mass or less, and further preferably 95.0% by mass or less.

The FEP can further contain a PAVE unit. Examples of the PAVE unit contained in the TFE/HFP copolymer include the same PAVE units as those described above.

When the FEP is a copolymer containing a TFE unit, an HFP unit, and a PAVE unit (hereinafter, also referred to as "TFE/HFP/PAVE copolymer"), the mass ratio (TFE/HFP/PAVE) is preferably 70 to 99.8/0.1 to 25/0.1 to 25 (% by mass). The mass ratio (TFE/HFP/PAVE) is more preferably 75 to 98/1.0 to 15/1.0 to 10 (% by mass). The TFE/HFP/PAVE copolymer preferably contains more than 1% by mass of HFP units and PAVE units in total.

The contents of the TFE units, the HFP units, and the PAVE units can be measured by the $^{19}$F-NMR method.

The melting point of the FEP is preferably 200 to 322° C., more preferably more than 200° C., and further preferably 220° C. or higher, and is more preferably 300° C. or lower, and further preferably 280° C. or lower.

The glass transition temperature (Tg) of the FEP is preferably 60 to 110° C., more preferably 65° C. or higher, and more preferably 100° C. or lower. The glass transition temperature is a value obtained by measuring dynamic viscoelasticity.

The content of the crosslinked perfluororesin in the fluorine-containing elastomer composition of the present disclosure is, with respect to 100 parts by mass of the non-crosslinked fluorine-containing elastomer, preferably 0.5 to 100 parts by mass, more preferably 5 to 50 parts by mass, and further preferably 5 to 25 parts by mass.

<Other Components>

The fluorine-containing elastomer composition of the present disclosure may further contain a filler other than the crosslinked perfluororesin.

Examples of the filler (excluding the crosslinked perfluororesin) include an imide-based filler having an imide structure such as polyimide, polyamideimide, and polyetherimide, an organic filler made of engineering plastic such as polyarylate, polysulfone, polyethersulfone, polyphenylene sulfide, polyether ether ketone, polyether ketone, and polyoxybenzoate, a metal oxide filler such as silicon oxide, aluminum oxide, and yttrium oxide, a metal carbide such as silicon carbide and aluminum carbide, a metal nitride filler such as silicon nitride and aluminum nitride, an inorganic filler such as aluminum fluoride and carbon fluoride, and the like.

Among these, from the viewpoint of a shielding effect of various plasmas, aluminum oxide, yttrium oxide, silicon carbide, silicon nitride, polyimide, and carbon fluoride are preferable.

Further, the inorganic filler and organic filler may be used alone or blended in a combination of two or more thereof.

The content of the filler (excluding the crosslinked perfluororesin) is, with respect to 100 parts by mass of the fluorine-containing elastomer, preferably 0.01 to 100 parts by mass, more preferably 0.05 to 50 parts by mass, further preferably 0.05 to 10 parts by mass, and particularly preferably 0.05 to 3 parts by mass.

Especially in fields not requiring high purity and non-contamination properties, an ordinary additive that is blended in the fluorine-containing elastomer composition, such as a processing aid, a plasticizer, and a colorant, can optionally be blended. One or more common cross-linking agents and cross-linking aids different from those described above may also be blended.

The fluorine-containing elastomer composition may contain an organic basic compound. Examples of the organic basic compound include: octadesylamines of the formula $CH_3(CH_2)_{17}—NH_2$; erucamides of the formula $H_2N—C(O)—(CH_2)_{11}—CH=CH—(CH_2)_7CH_3$; oleamides of the formula $H_2N—C(O)—(CH_2)_7—CH=CH—(CH_2)_7CH_3$; hexamethylenediamines of the formula $H_2N—(CH_2)_6—NH_2$; 1,8-diazabicycloundec-7-en (DBU) of the formula:

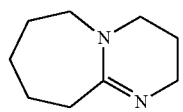 [SMILES: C1CCC2=NCCCN2CC1]

and the like.

The fluorine-containing elastomer composition of the present disclosure preferably further contains a cross-linking agent. When the fluorine-containing elastomer composition of the present disclosure contains a cross-linking agent, a crosslinked product as an article can be easily obtained from the fluorine-containing elastomer composition of the present disclosure. Examples of the cross-linking agent include cross-linking agents used in peroxide cross-linking, polyol cross-linking, polyamine cross-linking, triazine cross-linking, oxazole cross-linking, imidazole cross-linking, and thiazole cross-linking. When the fluorine-containing elastomer has a cyano group (—CN group), the cross-linking agent is preferably at least one or more selected from the group consisting of an oxazole cross-linking agent, an imidazole cross-linking agent, and a thiazole cross-linking agent.

The cross-linking agent used for peroxide crosslinking may be any organic peroxide that can easily generate a peroxy radical in the presence of heat or a redox system. Specific examples include 1,1-bis(t-butylperoxy)-3,5,5-trimethylcyclohexane, 2,5-dimethylhexane-2,5-dihydroperoxide, di-t-butyl peroxide (Perbutyl D), t-butylcumyl peroxide (Perbutyl C), dicumyl peroxide (Percumyl D, Percumyl D-40, Percumyl D-40 MB (T)), α,α-bis(t-butylperoxy)-p-diisopropylbenzene, 2,5-dimethyl-2,5-di(t-butylperoxy)hexane (Perhexa 25B, Perhexa 25B-40), 2,5-dimethyl-2,5-di(t-butylperoxy) hexyne-3 (Perhexyne 25B, Perhexyne 25B-40), benzoyl peroxide, t-butylperoxybenzene, 2,5-dimethyl-2,5-di(benzoylperoxy) hexane (Perhexa 25Z), t-butylperoxy maleate (t-butyl MA), t-butylperoxyisopropyl carbonate (Perbutyl I-75), methyl ethyl ketone peroxide (Permek D (DR), Permek H (HR, HY), Permek N (NR, NY), Permek S (SR), Permek F (FR), Permek G (GR, GY)), cyclohexanone peroxide (Perhexa H), acetylacetone peroxide (Percure AH, AL), 1,1-di(t-hexylperoxy)-3,3,5-trimethylcyclohexane (Perhexa TMH), 1,1-di(t-hexylperoxy)cyclohexane (Perhexa HC), 1,1-di(t-butylperoxy)-2-methyl cyclohexane (Perhexa MC), 1,1-di(t-butylperoxy) cyclohexane (Perhexa C-80(S), Perhexa C-75(EB), Perhexa C(C), Perhexa C-40, Perhexa C-40 MB(S)), 2,2-di(t-butylperoxy) butane (Perhexa 22), butyl 4,4-di-(t-butylperoxy) pentanoate (Perhexa V, Perhexa V-40 (F)), 2,2-di(4,4-di-(t-butylperoxy)cyclohexyl)propane (Pertetra A), p-menthane hydroperoxide (Permentha H), diisopropylbenzene hydroperoxide (Percumyl P), 1,1,3,3-tetramethylbutyl hydroperoxide (Perocta H), cumene hydroperoxide (Percumyl H-80), t-butyl hydroperoxide (Perbutyl H-69), di(2-t-butylperoxyisopropyl)benzene (Perbutyl P, Perbutyl P-40, Peroxymon F-40, Perbutyl P-40 MB (K)), di-t-hexyl peroxide (Perhexyl D), diisobutyryl peroxide (Peroyl IB), di(3,5,5-trimethylhexanoyl) peroxide (Peroyl 355 (S)), dilauroyl peroxide (Peroyl L), disuccinic peroxide (Peroyl SA), a mixture of di-(3-methylbenzoyl) peroxide, benzoyl(3-methylbenzoyl) peroxide, and dibenzoyl peroxide (Nyper BMT-K40, Nyper BMT-M), dibenzoyl peroxide (Nyper BW, Nyper BO, Nyper FF, Nyper BS, Nyper E, Nyper NS), di(4-methylbenzoyl) peroxide (Nyper PMB), di-n-propyl peroxydicarbonate (Peroyl NPP-50M), diisopropyl peroxydicarbonate (Peroyl IPP-50, Peroyl IPP-27), di(4-t-butylcyclohexyl) peroxydicarbonate (Peroyl TCP), di(2-ethylhexyl) peroxydicarbonate (Peroyl OPP), di-sec-butylperoxydicarbonate (Peroyl SBP), cumyl peroxyneodecanoate (Percumyl ND, Percumyl ND-50E), 1,1,3,3-tetramethylbutylperoxyneodecanoate (Perocta ND, Perocta ND-50E), t-hexyl peroxyneodecanoate (Perhexyl ND, Perhexyl ND-50E), t-butylperoxyneodecanoate (Perbutyl ND, Perbutyl ND-50E), t-butylperoxy neoheptanoate (Perbutyl NHP), t-hexylperoxy pivalate (Perhexyl PV, Perhexyl PV-50E), t-butylperoxy pivalate (Perbutyl PV, Perbutyl PV-40E), 1,1,3,3-tetramethylbutylperoxy-2-ethyl hexanoate (Perocta O), 2,5-dimethyl-2,5-di(2-ethylhexanoylperoxy)hexane (Perhexa 25 O), t-hexyl peroxy-2-ethyl hexanoate (Perhexyl O, Percure HO (N)), t-butylperoxy-2-ethyl hexanoate (Perbutyl O, Percure O), t-hexyl peroxyisopropyl monocarbonate (Perhexyl I), t-butylperoxy-3,5,5-trimethyl hexanoate (Perbutyl 355), t-butylperoxy laurate (Perbutyl L), t-butylperoxy-2-ethylhexyl monocarbonate (Perbutyl E), t-hexyl peroxybenzoate (Perhexyl Z), t-butyl peroxyacetate (Perbutyl A), a mixture of t-butylperoxy-3-methyl benzoate and t-butylperoxy benzoate (Perbutyl ZT), t-butylperoxy benzoate (Perbutyl Z), t-butylperoxyallyl monocarbonate (peromer AC), 3,3',4,4'-tetra(t-butylperoxycarbonyl)benzophenone (BTTB-25), and 2,3-dimethyl-2,3-diphenylbutane (Nofmer BC-90). Preferred among these are dialkyl-type organic peroxides, and particularly preferred is 2,5-dimethyl-2,5-di(t-butylperoxy) hexane. Usually, the type and amount of the organic peroxide are selected in consideration of the amount of active —O—O—, the decomposition temperature, and the like.

Further, the cross-linking aid that can be used in this case may be a compound having a reactivity with a peroxy radical and a polymer radical. Examples thereof include polyfunctional compounds having a functional group such as —CH=CH$_2$, —CH$_2$CH=CH$_2$, —CF=CF$_2$, —C(CF$_3$)=CF$_2$, —C(CH$_3$)CF$_2$, —CF=CF(CF$_3$), —CF=CF(CH$_3$), —C(C$_6$H$_5$)=CF$_2$, —CF=CF(C$_6$H$_5$), —CH=CF$_2$, —CF=CHF, —C(CF$_3$)=CHF, —CF=CH(CF$_3$), —CH=F(CF$_3$) and the like wherein "C$_6$H$_5$" represents a phenyl radical. Specific examples thereof include triallyl cyanurate, triallyl isocyanurate (TAIC), triacryl formal, triallyl trimerite, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallylacrylamide, 1,6-divinyldodecafluorohexane, and the like.

Further, examples of a cross-linking aid used together with the peroxide cross-linking agent include a compound represented by formula (31):

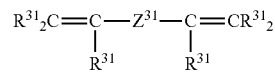

wherein each of the six $R^{31}$ is independently H, a halogen atom, or an optionally halogenated group having 1 to 5 carbon atoms in which an ether bond may be inserted, and $Z^{31}$ is an optionally halogenated linear or branched alkylene group or cycloalkylene group, or a (per) fluoropolyoxyalkylene group, each of which has 1 to 18 carbon atoms and optionally contains a hetero atom.

Examples of the compound represented by formula (31) include a compound represented by formula (32):

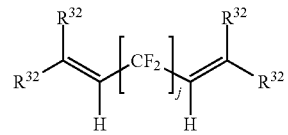

wherein j is an integer of 2 to 10, and preferably an integer of 4 to 8, and each of the four $R^{32}$ is independently H, F or an alkyl group or (per) fluoroalkyl group having 1 to 5 carbon atoms, a compound represented by formula (33):

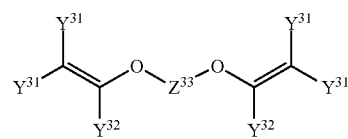

wherein each $Y^{31}$ is independently F, Cl, or H, each $Y^{32}$ is independently F, Cl, H, or $OR^{33}$, where $R^{33}$ is a branched or linear alkyl group that may be partially, substantially, or completely fluorinated or chlorinated, $Z^{33}$ is an optionally fluorinated divalent group having 2 to 10 carbon atoms in which an ether bond may be inserted, preferably $Z^{33}$ is a $—(CF_2)_m—$ group in which m is an integer of 3 to 5, and the compound represented by formula (33) is preferably $F_2C═CF—O—(CF_2)_5—O—CF═CF_2$), and a compound represented by formula (34):

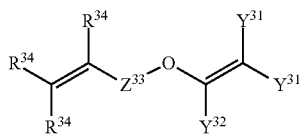

wherein $Y^{31}$, $Y^{32}$, and $Z^{33}$ are as defined above, and each $R^{34}$ is independently H, F, or an alkyl group or (per) fluoroalkyl group having 1 to 5 carbon atoms.

Examples of the cross-linking agent, or cross-linking aid used together with the peroxide cross-linking agent, include compounds having at least one structure represented by formula (35):

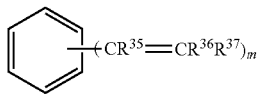

wherein $R^{35}$ to $R^{37}$ are each independently a hydrogen atom, a fluorine atom, an alkyl group, a fluorinated alkyl group, or a substituted or unsubstituted aryl group, and at least one of $R^{35}$ to $R^{37}$ is a fluorine atom or a group containing a fluorine atom; m is an integer of 1 to 5; when m is 2 or more, m-number of $R^{35}$ to $R^{37}$ may be the same or different with each other; and the hydrogen atoms of the benzene ring may be substituted. When m is 1, it is preferable to have two or more of the structures.

Examples of the compound having a structure represented by formula (36) include compounds represented by formula (36):

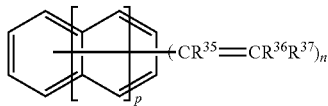

wherein $R^{35}$ to $R^{37}$ are as defined above; p is an integer of 0 to 2; and n is an integer of 2 to 6,
compounds represented by formula (37):

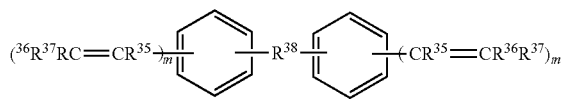

wherein $R^{35}$ to $R^{37}$ are as defined above, $R^{38}$ is a single bond, $—SO_2—$, $—O—$, $—S—$, $—CO—$, a heteroatom-containing group, a substituted or unsubstituted alkylene group, a substituted or unsubstituted cycloalkylene group or a substituted or unsubstituted arylene group, m is an integer of 1 to 5, and a part or all of these groups may be fluorinated.

The heteroatom-containing group is not limited as long as it is a divalent group containing a heteroatom. Examples of the heteroatom include an oxygen atom, a nitrogen atom, a sulfur atom, a boron atom, and a phosphorus atom.

Examples of the cross-linking agent used for polyol crosslinking include polyhydric alcohol compounds such as bisphenol A and bisphenol AF.

Examples of the cross-linking agent used for polyamine crosslinking include polyamine compounds such as hexamethylenediamine carbamate, N,N'-dicinenamiridene-1,6-hexanediamine, and 4,4'-bis(aminocyclohexyl)methane carbamate.

Examples of the cross-linking agent used for triazine crosslinking include organic tin compounds such as tetraphenyltin and triphenyltin.

Examples of the cross-linking agents used for oxazole crosslinking, imidazole crosslinking, and thiazole crosslinking include a bisdiaminophenyl-based cross-linking agent, a bis-aminophenol-based cross-linking agent, and a bis-aminothiophenol-based cross-linking agent represented by formula (41):

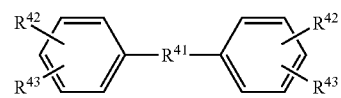

wherein $R^{41}$ is $—SO_2—$, $—O—$, $—CO—$, an alkylene group having 1 to 6 carbon atoms, a perfluoroalkylene group having 1 to 10 carbon atoms, a single bond, or a group represented by:

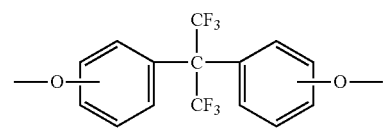

one of $R^{42}$ and $R^{43}$ is $—NH_2$ and the other is $—NHR^{44}$, $—NH_2$, $—OH$, or $—SH$, $R^{44}$ is a hydrogen atom, a fluorine atom, or a monovalent organic group, preferably $R^{42}$ is $—NH_2$ and $R^{43}$ is $—NHR^{44}$; preferred specific examples of the alkylene group having 1 to 6 carbon atoms include a methylene group, an ethylene group, a propylene group, a butylene group, a pentylene group, a hexylene group, and the like, and examples of the perfluoroalkylene group having 1 to 10 carbon atoms include:

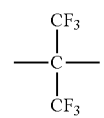

These compounds are known as examples of bisdiaminophenyl compounds in Japanese Patent Publication No. 2-59177, Japanese Patent Laid-Open No. 8-120146, and the like;
a bisamidrazone-based cross-linking agent represented by formula (42):

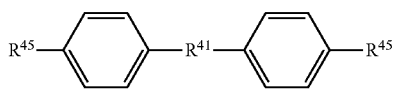

wherein R$^{41}$ is as defined above, and each R$^{45}$ is independently any one of the following groups:

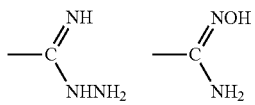

an amidrazone-based cross-linking agent represented by formula (43):

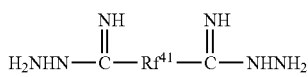

wherein Rf$^{41}$ is a perfluoroalkylene group having 1 to 10 carbon atoms; and a bisamidoxime-based cross-linking agent represented by formula (44):

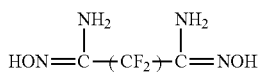

wherein n is an integer of 1 to 10, a compound represented by formula (45): HN=CR$^{45}$R$^{46}$, wherein R$^{45}$ is selected from the group consisting of H, NH$_2$, and NHR$^{47}$, R$^{46}$ is selected from the group consisting of Ph, SO$_2$H, NR$^{48}$R$^{49}$, 2-pyridine, and CH$_2$CONH$_2$, R$^{47}$ is selected from the group consisting of Ph, NH$_2$, and CN, R$^{48}$ is selected from the group consisting of H, NHPh, CH$_2$CONH$_2$, a linear alkyl group having 1 to 8 carbon atoms, and a branched alkyl group having 1 to 8 carbon atoms, and R$^{49}$ is selected from the group consisting of Ph, COOC(CH$_3$)$_3$, NH$_2$, CH$_2$COOH, CSNH$_2$, CNHNH$_3$$^+$Cl$^-$, p-phenyl CN,

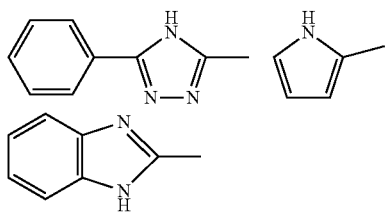

and COPh, and the like. These bisaminophenol-based cross-linking agents, bisaminothiophenol-based cross-linking agents, bisdiaminophenyl-based cross-linking agents, and the like have conventionally been used in crosslinking systems that use a cyano group as a crosslinking point, but these agents also react with a carboxyl group and an alkoxycarbonyl group to form an oxazole ring, a thiazole ring, and an imidazole ring to provide a crosslinked product.

Further, examples of the cross-linking agent include a cross-linking agent represented by formula (46): X$^{41}$—(CH$_2$)$_n$—R$^{50}$—(CH$_2$)$_m$—X$^{41}$, wherein each X$^{41}$ is independently an alkyne group, a nitrile group, or Y$^{41}$$_p$N$_3$, wherein Y$^{41}$ is SO, SO$_2$, C$_6$H$_4$, or CO, and p is 0 or 1, n and m are independently integers of 1 to 4, and R$^{50}$ is selected from the group consisting of i) a fluoroalkylene group having 3 to 10 carbon atoms,
ii) a fluoralkoxylene group having 3 to 10 carbon atoms,
iii) a substituted arylene group,
iv) an oligomer including a copolymerization unit of vinylidene fluoride and perfluoro(methylvinylether),
v) an oligomer including a copolymerization unit of vinylidene fluoride and hexafluoropropylene,
vi) an oligomer including a copolymerization unit of tetrafluoroethylene and perfluoro(methylvinylether), and
vii) an oligomer including a copolymerization unit of tetrafluoroethylene and a hydrocarbon olefin.

This cross-linking agent is preferably used together with a fluorine-containing elastomer having a nitrile group, an azide group, a sulfonyl azide group, a carbonyl azide group, or an alkyne group. For example, the nitrile group of the fluorine-containing elastomer reacts with the azide group of the cross-linking agent to form a tetrazole ring to provide a crosslinked product.

Examples of a particularly preferred cross-linking agent include a compound having a plurality of 3-amino-4-hydroxyphenyl groups or 3-amino-4-mercaptophenyl groups, or a compound represented by formula (47):

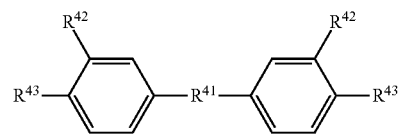

wherein R$^{41}$, R$^{42}$, and R$^{43}$ are as defined above. Specifically, examples include 2,2-bis(3-amino-4-hydroxyphenyl) hexafluoropropane (generic name: bis(aminophenol)AF), 2,2-bis(3-amino-4-mercaptophenyl) hexafluoropropane, tetraaminobenzene, bis-3,4-diaminophenylmethane, bis-3,4-diaminophenyl ether, 2,2-bis(3,4-diaminophenyl) hexafluoropropane, 2,2-bis[3-amino-4-(N-phenylamino)phenyl]hexafluoropropane, 2,2-bis[3-amino-4-(N-methylamino)phenyl] hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl] hexafluoropropane, 2,2-bis[3-amino-4-(N-benzylamino)phenyl]hexafluoropropane, and the like.

Among these, from the viewpoints of heat resistance, steam resistance, amine resistance, and good crosslinkability, the cross-linking agent is preferably 2,2-bis[3-amino-4-(N-phenylamino)phenyl]hexafluoropropane.

The content of the cross-linking agent is, with respect to 100 parts by mass of the fluorine-containing elastomer, preferably 0.05 to 10 parts by mass, and more preferably 0.5 to 5 parts by mass.

The fluorine-containing elastomer composition can be prepared by mixing each of the above-described components by using an ordinary polymer processing machine, for example, an open roll, a Banbury mixer, a kneader, or the like. In addition, the fluorine-containing elastomer composition can also be prepared by a method using a closed mixer. The fluorine-containing elastomer composition can be suitably used as a molding material for obtaining an article by molding, and can also be suitably used as a molding material for obtaining an article by crosslinking and molding.

Examples of the method for producing the fluorine-containing elastomer composition of the present disclosure include a production method including:
- obtaining a crosslinked perfluororesin by irradiating a non-crosslinked perfluororesin with radiation; and
- obtaining the fluorine-containing elastomer composition by mixing the crosslinked perfluororesin, a fluorine-containing elastomer, and arbitrary components such as a cross-linking agent and a filler.

The article of the present disclosure is obtained from the above-described fluorine-containing elastomer composition. The article of the present disclosure has excellent plasma resistance and a small compression set even when used under harsh conditions. The article of the present disclosure is preferably a crosslinked product obtained by cross-linking the above-described fluorine-containing elastomer composition because plasma resistance and resistance to compression set are much better.

Further, according to the present disclosure, an article containing a polymer in which a rate of decrease in weight by $NF_3$ remote plasma is 0.20% or less and a compression set is 55% or less is provided. The article of the present disclosure has excellent plasma resistance and a small compression set even when used under harsh conditions. The polymer used in an article characterized by its rate of decrease in weight by $NF_3$ remote plasma and its compression set is preferably the above-described fluorine-containing elastomer. In addition, the article of the present disclosure is preferably a crosslinked product obtained by cross-linking a fluorine-containing elastomer.

In the following, articles characterized by their rate of decrease in weight by $NF_3$ remote plasma and compression set and articles obtained from the above-described fluorine-containing elastomer composition will both be described.

The article of the present disclosure has excellent heat resistance and a small weight change with respect to $NF_3$ remote plasma that is exposed in a semiconductor fabrication process.

Further, the article of the present disclosure has a small compression set even after being used under harsh conditions. As used herein, the harsh conditions are, for example, in a state in which the article is compressed at a compressibility of 25%, the article is used at 200° C. for 70 hours, then used at 70° C. for 24 hours, and left at 23° C. for 30 minutes. For example, when the article of the present disclosure is used as a sealing material for a semiconductor fabrication apparatus, there are cases where the sealing material may be used at a temperature of 200° C. or higher in a compressed state when the semiconductor fabrication apparatus is in operation. After that, when the operation of the semiconductor fabrication apparatus is stopped, the sealing material is slowly cooled to room temperature while still being compressed, and is then left at room temperature. Therefore, the sealing material needs to be capable of withstanding use under such harsh conditions. The article of the present disclosure has excellent high-temperature sealing properties and excellent low-temperature sealing properties, and can withstand use under such harsh conditions.

The article of the present disclosure has a rate of decrease in weight by $NF_3$ remote plasma of 0.20% or less. The rate of decrease in weight by $NF_3$ remote plasma is the rate at which weight decreases when the article is irradiated with $NF_3$ remote plasma. The rate of decrease in weight by $NF_3$ remote plasma can be calculated by using a fluorine radical generator to generate an $NF_3$ plasma, irradiating the article with the $NF_3$ remote plasma under the following conditions, and calculated from the mass of the article before and after the $NF_3$ remote plasma irradiation.

(Plasma Irradiation Conditions)
Sample: O-ring (P24 size)
Fluorine radical generator: Astron Atomic Fluorine Generator Model AX7652-2 (manufactured by MKS)
Gas flow rate: $Ar/NF_3$=1 (L/min)/1 (L/min)
Pressure: 3 Torr
Irradiation temperature: 250° C.
Irradiation time: 12 hours (O-ring position in the chamber is moved every 2 hours)

The compression set of the article of the present disclosure is preferably 55% or less, more preferably 53% or less, and further preferably 50% or less. The compression set can be calculated by, in a state in which the article is compressed at a compressibility of 25%, leaving the article for 70 hours at 200° C. followed by further leaving it for 24 hours at 70° C., then releasing the compression, leaving the article for 30 minutes at 20° C., and then measuring the thickness of the compressed article.

Examples of the method for producing the article of the present disclosure include a production method including:
- obtaining a crosslinked perfluororesin by irradiating a non-crosslinked perfluororesin with radiation;
- obtaining a fluorine-containing elastomer composition by mixing the crosslinked perfluororesin, a fluorine-containing elastomer, and arbitrary components such as a cross-linking agent and a filler; and
- obtaining an article from the fluorine-containing elastomer composition.

Examples of a method for obtaining an article from a fluorine-containing elastomer composition include a method in which a preform is obtained by using the above-described fluorine-containing elastomer composition as a molding material, and then crosslinking the preform. The method for obtaining the preform by using the fluorine-containing elastomer composition as a molding material may be an ordinary method, and is performed by a known method such as a method of heating and compressing in a mold, a method of press-fitting into a heated mold, and a method of extruding with an extruder. In the case of an extruded product such as a hose and an electric wire, the article can be obtained by heating and crosslinking with steam or the like after extrusion.

The above-described crosslinking can be performed in the order of primary crosslinking and secondary crosslinking. The primary crosslinking is preferably carried out at 150 to 200° C. for 5 to 120 minutes, and more preferably at 170 to 190° C. for 5 to 60 minutes. As the crosslinking means, known crosslinking means may be used, and examples thereof include press-crosslinking.

The secondary crosslinking is preferably carried out at 250 to 320° C. for 2 to 24 hours, and more preferably at 280 to 310° C. for 5 to 20 hours. As the crosslinking means, known crosslinking means may be used, and examples thereof include oven crosslinking.

The article of the present disclosure can be suitably used as a sealing material for a semiconductor fabrication apparatus that particularly requires heat resistance, and particularly a semiconductor fabrication apparatus in which high-density plasma irradiation is performed. Examples of the sealing material include O-rings, square-rings, gasket, packing, oil seals, bearing seals, lip seals, and the like. In addition, the molded article of the present disclosure can also be used as various polymer products used in semiconductor fabrication apparatus, such as diaphragms, tubes, hoses, various rubber rolls, and belts. Further, the molded article of the present disclosure can also be used as a coating material and a lining material.

As referred to herein, the "semiconductor fabrication apparatus" is not limited to an apparatus for fabricating semiconductors, and widely includes general fabrication apparatus used in the semiconductor field requiring a high level of cleanliness, such as apparatus for manufacturing liquid crystal panels and plasma panels. Examples thereof include the following.

(1) Etching Apparatus
  Dry etching apparatus
  Plasma etching apparatus
  Reactive ion etching apparatus
  Reactive ion beam etching apparatus
  Sputter etching apparatus
  Ion beam etching apparatus
  Wet etching apparatus
  Ashing apparatus
(2) Cleaning Apparatus Dry Etching Cleaning Apparatus
  $UV/O_3$ cleaning apparatus
  Ion beam cleaning apparatus
  Laser beam cleaning apparatus
  Plasma cleaning apparatus
  Gas etching cleaning apparatus
  Extraction and cleaning apparatus
  Soxhlet extraction cleaning apparatus
  High-temperature high-pressure extraction cleaning apparatus
  Microwave extraction cleaning apparatus
  Supercritical extraction cleaning apparatus
(3) Exposure Apparatus
  Stepper
  Coater/developer
(4) Polishing Apparatus
  CMP apparatus
(5) Film Formation Apparatus
  CVD apparatus
  Sputtering apparatus
(6) Diffusion/Ion Implantation Apparatus
  Oxidation diffusion apparatus
  Ion implantation apparatus The article of the present disclosure exhibits excellent performance as a sealing material for, for example, a CVD apparatus, a plasma etching apparatus, a reactive ion etching apparatus, an ashing apparatus, and an excimer laser exposure machine.

Embodiments have been described above, but it will be understood that various modifications to the modes and details may be made without departing from the spirit and scope of the claims.

EXAMPLES

Next, embodiments of the present disclosure will be described with reference to examples, but the present disclosure is not limited to only these examples.

The numerical values in the examples were measured by the following methods.

<Melting Point>

A heat-of-fusion curve when the temperature was raised at a rate of 10° C./min was drawn using a differential scanning calorimeter [DSC], and the temperature of the peak in the heat-of-fusion curve was determined as the melting point.

<Melt Viscosity>

The melt viscosity was measured in accordance with ASTM D1238 using a flow tester (manufactured by Shimadzu Corporation) and a 2ϕ-8L die by measuring a 2 g sample heated in advance at 380° C. for 5 minutes and maintaining at that temperature under a load of 0.7 MPa.

<Compositional Features and Fluorine Content of Fluororesin and Fluorine-Containing Elastomer>

The compositional features and fluorine content of the fluororesin and fluorine-containing elastomer were measured by $^{19}$F-NMR analysis.

<Content of Tertiary Carbon>

The content of the tertiary carbon was calculated in accordance with the below calculation formula by using an NMR (solid-state nuclear magnetic resonance apparatus $^{19}$F-NMR manufactured by Bruker) to perform a $^{19}$F-NMR measurement and determine the following peak intensities (integral values of the peaks) A to D.

Peak Intensity A
  Intensity of the peaks derived from the three CF of $CF_3$ observed at chemical shifts of −60 to −85 ppm Peak Intensity B
  Intensity of the peaks derived from the four CF mainly derived from TFE observed at chemical shifts of −90 to −150 ppm Peak Intensity C
  Intensity of the peaks derived from one CF observed at chemical shifts of −150 to −160 ppm Peak Intensity D
  Intensity of the peaks derived from one CF of a tertiary carbon observed at chemical shifts of −176 to −190 ppm Calculation Formula $$\text{Content (mol \%) of tertiary carbon} = \\ 100 \times (\text{peak intensity } D) / \{(\text{peak intensity } A/3) + \\ (\text{peak intensity } B/4) + (\text{peak intensity } C) + (\text{peak intensity } D)\}$$

<Rate of Decrease in Weight by $NF_3$ Remote Plasma>

Six O-rings (P24 size) produced in the examples and comparative examples were allowed to stand in a process chamber. The plasma generated using the fluorine radical generator was fed into the process chamber, and the six O-rings were cleaned under the following plasma irradiation conditions. The rate of decrease in weight by $NF_3$ remote plasma was calculated from the masses of the six O-rings before and after the plasma irradiation.

(Plasma Irradiation Conditions)
  Fluorine radical generator: Astron Atomic Fluorine Generator Model AX7652-2 (manufactured by MKS)
  Gas flow rate: $Ar/NF_3$=1 (L/min)/1 (L/min)
  Pressure: 3 Torr
  Irradiation temperature: 250° C.
  Irradiation time: 12 hours (O-ring position in the chamber is moved every 2 hours)

(Mass Measurement)

The mass of each O-ring before and after plasma irradiation was measured using an electronic analysis balance BP211D (manufactured by Sartorius). Then, the rate of decrease in weight by $NF_3$ remote plasma was calculated by the following formula.

$$dW = (W_0 - W_1)/W_0 \times 100$$

$dW$: Rate of decrease in weight by $NF_3$ remote plasma
$W_0$: Mass of O-ring before plasma irradiation
$W_1$: Mass of O-ring after plasma irradiation <Compression Set>

The compression set was measured in accordance with the method described in ASTM D395 or JIS K6262. The O-rings produced in the examples and comparative examples were compressed at a compressibility of 25% at normal temperature using a compression device (O-ring having a thickness (cross-sectional diameter) of 3.5 mm compressed to a thickness of 2.625 mm).

Next, the compression device to which the compressed O-ring was fixed was placed in an electric furnace, left at 200° C. for 70 hours, and then the compression device was taken out from the electric furnace. Then, the compression device to which the compressed O-ring was fixed was placed in another electric furnace and left at 70° C. for 24 hours. The O-ring was removed from the compression device, the removed O-ring was placed in a thermostatic chamber, left at 23° C. for 30 minutes, and the thickness ($t_2$) of the O-ring was measured. The compression set was calculated by the following formula. A small compression set means that the compression set is small and the resistance to compression set is excellent even after the crosslinked product is used under harsh conditions.

$$\text{Compression set }(\%) = (t_0 - t_2)/(t_0 - t_1) \times 100$$

$t_0$: Original thickness of O-ring (mm)
$t_1$: Spacer thickness (mm)
$t_2$: O-ring thickness (mm) after compression test
In the above test, $t_0$=3.5 mm and $t_1$=2.625 mm.

Production Example 1 (Production of Crosslinked PTFE)

A non-fibrillatable, non-crosslinked, low molecular weight PTFE powder (melting point=328° C., melt viscosity (380° C.)=3×10$^3$ Pa·s, TFE unit content with respect to all monomer units=99.9% by mass, fluorine content=76% by mass) was placed in an electron beam irradiation container of an electron beam irradiation device, and then nitrogen gas was added to make the inside of the container a nitrogen atmosphere. The temperature inside the container was raised to 310° C., and after the temperature became stable, an electron beam was irradiated under the following conditions to obtain a crosslinked PTFE. The content of tertiary carbons in the crosslinked PTFE was 0.701 mol %.
(Electron Beam Irradiation Conditions)
  Temperature set value: 310° C. (adjusted to 310 to 330° C. during irradiation)
  Irradiation conditions: 3.0 MV 5.0 mA 3.0 m/min
  Irradiation dose: 250 kGy (10 kGy×25 passes)
  Temperature/humidity: 22.8° C./31%
  Nitrogen flow rate: 295 to 300 L/min
The obtained crosslinked PTFE was pulverized. The powder obtained by pulverization was passed through a sieve mesh having an opening size of 25 μm. In the examples, the powder that passed through the sieve mesh was used as the crosslinked PTFE.

Production Example 2 (Production of Crosslinked ETFE)

A non-crosslinked PTFE powder (ethylene/TFE copolymer, melting point=257° C., ethylene unit content with respect to all monomer units=16% by mass, TFE unit content with respect to all monomer units=77% by mass, fluorine content=44% by mass) was placed in an electron beam irradiation container of an electron beam irradiation device, and then nitrogen gas was added to make the inside of the container a nitrogen atmosphere. The temperature inside the container was raised to 250° C., and after the temperature became stable, an electron beam was irradiated under the following conditions to obtain a crosslinked ETFE.
(Electron Beam Irradiation Conditions)
  Temperature set value: 250° C.
  Irradiation conditions: 3.0 MV 5.0 mA 3.0 m/min
  Irradiation dose: 250 kGy (10 kGy×25 passes)
  Temperature/humidity: 22.8° C./31%
  Nitrogen flow rate: 295 to 300 L/min
The obtained crosslinked ETFE was pulverized. The powder obtained by pulverization was passed through a sieve mesh having an opening size of 25 μm. In the comparative examples, the powder that passed through the sieve mesh was used as the crosslinked ETFE.

Example 1

A fluorine-containing elastomer composition was prepared by kneading with an open roll 100 parts by mass of a fluorine-containing elastomer (TFE/PMVE/CF$_2$=CFOCF$_2$CF(CF$_3$)OCF$_2$CF$_2$CN=59.3/39.9/0.8 (mol %)), 20 parts by mass of the crosslinked PTFE obtained in Production Example 1, 0.8 parts by mass of 2,2-bis[3-amino-4-(N-phenylamino)phenyl]hexafluoropropane as a cross-linking agent, and 0.1 parts by mass of silicon nitride as a cross-linking aid.

The obtained fluorine-containing elastomer composition was pressed at 180° C. for 30 minutes to perform cross-linking, and further crosslinked in an air oven at 290° C. for 18 hours to prepare a P24 size O-ring. Using the obtained O-ring, the rate of decrease in weight by NF$_3$ remote plasma, and compression set were measured by the methods described above. The results are shown in Table 1.

Comparative Examples 1 to 6

O-rings was produced in the same manner as in Example 1, except that each of the following compounds were used instead of the crosslinked PTFE. The obtained O-rings were evaluated in the same manner as described above. The results are shown in Table 1.

Comparative Example 1: Non-crosslinked, low molecular weight PTFE powder used in Production Example 1.
Comparative Example 2: Quinacridone
Comparative Example 3: Polyimide
Comparative Example 4: SiO$_2$ (trade name "Carplex 1120", manufactured by Evonik Japan)
Comparative Example 5: MT carbon black (trade name "N-990", manufactured by Cancarb)
Comparative Example 6: The crosslinked ETFE obtained in Production Example 2

TABLE 1

| | Compound | Rate of decrease in weight by NF$_3$ remote plasma (%) | Compression set (%) |
|---|---|---|---|
| Example 1 | Crosslinked PTFE | 0.11 | 49 |
| Comparative Example 1 | Non-crosslinked PTFE | 0.11 | 57 |
| Comparative Example 2 | Quinacridone | 0.23 | 43 |
| Comparative Example 3 | Polyimide | 0.33 | 39 |
| Comparative Example 4 | SiO$_2$ | 0.90 | 42 |
| Comparative Example 5 | MT carbon black | 0.46 | 37 |
| Comparative Example 6 | Crosslinked ETFE | 0.42 | 60 |

The invention claimed is:

1. A fluorine-containing elastomer composition comprising a non-crosslinked fluorine-containing elastomer and a crosslinked perfluororesin, wherein the crosslinked perfluororesin is included in the fluorine-containing elastomer composition in a powder form, and a content of the crosslinked perfluororesin is 0.5 to 100 parts by mass with respect to 100 parts by mass of the non-crosslinked fluorine-containing elastomer, and wherein the fluorine-containing elastomer composition does not include carbon fluoride.

2. The fluorine-containing elastomer composition according to claim 1, wherein the crosslinked perfluororesin is at least one selected from the group consisting of a crosslinked polytetrafluoroethylene, a crosslinked tetrafluoroethylene/perfluoro (alkyl vinyl ether) copolymer, and a crosslinked tetrafluoroethylene/hexafluoropropylene copolymer.

3. The fluorine-containing elastomer composition according to claim 1, wherein the crosslinked perfluororesin is a crosslinked polytetrafluoroethylene.

4. The fluorine-containing elastomer composition according to claim 1, further comprising a filler.

5. The fluorine-containing elastomer composition according to claim 1, further comprising a cross-linking agent.

6. An article obtained from the fluorine-containing elastomer composition according to claim 1.

* * * * *